United States Patent [19]

Maeland

[11] 4,359,396
[45] Nov. 16, 1982

[54] HYDRIDE OF BERYLLIUM-BASED INTERMETALLIC COMPOUND

[75] Inventor: Arnulf J. Maeland, Succasunna, N.J.

[73] Assignee: Allied Corporation, Morris Township, Morris County, N.J.

[21] Appl. No.: 213,145

[22] Filed: Dec. 4, 1980

[51] Int. Cl.$^3$ .............................. C09K 3/00; C01F 3/00
[52] U.S. Cl. ................. 252/188.25; 433/644; 420/401
[58] Field of Search ............ 423/644; 75/150; 252/188.25

[56] References Cited

U.S. PATENT DOCUMENTS

| | | | |
|---|---|---|---|
| 3,664,889 | 5/1972 | McCarthy et al. | 75/150 |
| 3,832,456 | 8/1974 | Kobetz et al. | 423/645 |
| 3,917,809 | 11/1975 | Murib et al. | 423/645 |
| 4,116,687 | 9/1978 | Hasegawa | 75/177 |
| 4,153,484 | 5/1929 | Gamo et al. | 423/644 |
| 4,163,666 | 8/1979 | Shaltiel et al. | 75/177 |
| 4,195,989 | 1/1980 | Gamo et al. | 75/175.5 |
| 4,228,145 | 10/1980 | Gamo et al. | 423/644 |

FOREIGN PATENT DOCUMENTS 415326  11/1974  U.S.S.R. .............................. 75/150

OTHER PUBLICATIONS

G. R. Stewart et al., Solid State Communications, vol. 30, pp. 709–711, (1979).

G. Bruzzone et al., Int. J. Hydrogen Energy, vol. 5, pp. 317–322, (1980).

*Primary Examiner*—Herbert T. Carter
*Attorney, Agent, or Firm*—Alan M. Doernberg; Gerhard H. Fuchs

[57] ABSTRACT

Alloys of beryllium with Group IV or V metals of C22 Aluminum Boride, C15 Laves or C14 Laves phase structures and an atom ratio of 2:1 form hydrides reversibly. Either beryllium or the Group IV or V metal or both are in some instances substituted for in part by selected metals up to the solubility limit in the phase structures. Exemplary systems are based on $Be_2Ti$ with substitutions made to increase the stability of the hydride, or are based on $Be_2Zr$ with substitutions made to decrease the stability of the hydride.

10 Claims, No Drawings

HYDRIDE OF BERYLLIUM-BASED INTERMETALLIC COMPOUND

DESCRIPTION

BACKGROUND OF THE INVENTION

Metal hydrides are a class of compounds which have found utility for the storage of hydrogen in solid form, heat and energy storage in the form of hydrogen absorption, electrochemical applications such as battery cells based upon electrochemical reaction of metals to form hydrides and other applications. For many applications a significant property is the amount of hydrogen stored in the hydride as a fraction of the total weight of hydride. For such applications metals with lowest atomic weights are desirable. While lithium hydride (LiH) has been used in many hydride systems, beryllium hydride ($BeH_2$) has not been used, even though it has a higher theoretical weight capacity for hydrogen than lithium. This failure has been because beryllium hydride does not form easily and reversably by direct reaction between gaseous hydrogen and beryllium metal.

Beryllium hydride has been considered for rocket fuels and other applications where weight density is important and where hydrogen is desorbed from the hydride, but need not be reabsorbed. Beryllium hydride has been produced for such applications by a variety of complex chemical processes such as described in the following United States patents: Nos.

| | | |
|---|---|---|
| 3,574,563 | Gunderloy, Jr. et al. | Apr. 13, 1971 |
| 3,811,972 | Niebylski et al. | May 21, 1974 |
| 3,816,607 | Frey, Jr. et al. | June 11, 1974 |
| 3,816,193 | Brendell | June 11, 1974 |
| 3,816,608 | Baker et al. | June 11, 1974 |
| 3,832,456 | Kobetz et al. | Aug. 27, 1974 |
| 3,845,199 | Shepherd, Jr. | Oct. 29, 1974 |
| 3,864,464 | Shepherd, Jr. et al. | Feb. 4, 1975 |
| 3,872,224 | Lowrance et al. | Mar. 18, 1975 |
| 3,883,646 | Roberts | May 13, 1975 |
| 3,917,809 | Murib et al. | Nov. 4, 1975 |
| 3,919,320 | Murib et al. | Nov. 11, 1975 |
| 3,971,846 | Skelcey | July 27, 1976 |

In addition hydrides of alloys containing beryllium have recently been proposed wherein beryllium is a relatively minor portion of the alloy. Because of the predominance of heavier metals, such systems have significantly lower weight densities of hydrogen than beryllium hydride as prepared by the above chemical process.

BRIEF DESCRIPTION OF THE INVENTION

The present invention relates to hydrides of alloys of certain structures which contain a major portion of beryllium and which absorb hydrogen reversibly and relatively easily. Thus the present invention includes a hydride of the formula $$Be_{2-x}A_xT_{1-y}M_yH_z$$

wherein the alloy $Be_{2-x}A_xT_{1-y}M_y$ is of an Aluminum Boride Phase Structure, Cubic C15 Laves Phase Structure or Hexagonal C14 Laves Phase Structure, wherein A is at least one transition metal selected from the group consisting of Cr, Mn, Fe, Co, Ni and Cu, wherein T is at least one Group IV or V metal selected from the group consisting of Ti, Zr, Hf, V, Nb and Ta, wherein M is at least one metal selected from the group consisting of Cr, Mn, Fe, Cu, Mo, Ag, Pd, Re and Al, and wherein x is between 0 and 0.5, y is between 0 and 1 and z is at least 0.1.

It should be appreciated that the requirement that the alloy be of the Aluminum Boride Phase Structure, Cubic C15 Laves Phase Structure or Hexagonal C14 Laves Phase Structure places additional limitations upon x and y in certain instances since amounts of the metals A and M beyond those which retain one of the three stated phase structures would not be permitted.

The present invention also includes a method of forming a hydride composition which comprises reacting gaseous hydrogen with the alloy $Be_{2-x}A_xT_{1-y}M_y$.

DETAILED DESCRIPTION OF THE INVENTION

The alloys used to make the hydrides of the present invention are of the Aluminum Boride Phase Structure (C22), the Cubic Laves Phase Structure (C15) or the C14 Hexagonal Laves Phase Structure (C14). The six basic alloys and their phase structures are:

| | |
|---|---|
| $Be_2Zr$ | C22 |
| $Be_2Hf$ | C22 |
| $Be_2Nb$ | C15 |
| $Be_2Ta$ | C15 |
| $Be_2Ti$ | C15 |
| $Be_2V$ | C14 |

One preferred group of alloys are those based on zirconium. While $Be_2Zr$ forms a stable hydride easily at room temperature and low hydrogen pressure, its utility is somewhat limited by the difficulty of removing the hydrogen. In some forms the zirconium is replaced in part (up to the stability limit in the C22 phase) by W, Mo, Ag, Pd, Re or Al. Especially preferred in this group are alloys wherein x is 0 and M is Al, Ag, or Mo. Another variation of the $Be_2Zr$ structure is where Be is partially replaced by Cr, Mn, Fe, Co, Ni or Cu, and especially by Mn, Fe or Co, which have a destabilizing effect. Thus, for this group y is 0 and A is Mn, Fe or Co. It is also possible to replace both Be and Zr in part.

The $Be_2Hf$ system is similar to the $Be_2Zr$ system in being stable and difficult to remove hydrogen. Thus preferred alloys based on hafnium are those where x is 0 and M is Al, Ag or Mo and those wherein y is 0 and A is Mn, Fe or Co. Both Be and Hf may be substituted for in part.

The $Be_2Ti$ system reacts with hydrogen to a substantial degree only at elevated pressures and is therefore preferably substituted in ways that increase the hydride stability. It is therefore preferred when T is Ti that y is 0 and A is Cr, Ni or Cu, which are more stable hydride formers. The $Be_2V$, $Be_2Nb$ and $Be_2Ta$ systems are similar.

In addition mixtures of Group IV and V metals may be used for T, and especially mixtures of Zr or Hf with Ti, V, Nb or Ta. One such system is where T is 70-95% Zr and 5-30% of at least one of Ti, V, Nb or Ta. In such a system it is preferred that y be 0 and A be Mn, Fe or Co. These additional substitutions for Be further destabilize the beryllium-zirconium hydride. Another preferred group is where T is 70-95% of any of Ti, V, Nb or Ta and 5-30% Zr or Hf. Here it is preferred that y is 0 and A is Cr, Ni or Cu, since these metals aid Zr or Hf in adding hydride stability to the $Be_2Ti$, $Be_2V$, $Be_2Ta$, or $Be_2Nb$ system.

For simplicity some preferred alloys are those wherein y is 0 to 0.1, x is 0 to 0.1 or both; and especially where y is 0, x is 0 or both. If both are 0, it is preferred that T be a mixture of Zr or Hf with Ti, V, Nb or Ta as described above.

The alloys used in the present invention may be made by mixing the various metals in the desired proportions in an arc furnace under an inert atmosphere (e.g. argon) and cooling to form buttons or pellets of alloy. Repeated remelting and stirring is preferred, and in some cases may be required, to increase homogeneity. The buttons or pellets may be hydrided directly or first crushed under inert atmosphere.

To form hydrides, the alloy is charged in a steel vessel which is pressurized with hydrogen at a desired temperature, as is conventional. Alloys which do not absorb hydrogen at levels of at least 0.1 moles per formula unit at room temperature and 100 atmospheres pressure (or lower) are generally unsuitable. The hydrides, when fully hydrided, should desirably give up substantial amounts of hydrogen either by raising the temperature to no more than about 150° C., or lowering the pressure to no less than 0.1 atmospheres, or both raising the temperature and lowering the pressure.

EXAMPLE 1

$Be_2Zr$ reacted exothermically with hydrogen at room temperature and atmospheric pressure to form $Be_2ZrH_{1.5}$. From a pressure-composition isotherm determined at room temperature and in conjunction with X-ray diffraction studies, the following details of the reaction may be deduced. There is an initial narrow region of solubility of hydrogen in $Be_2Zr$ in which the solubility increases as a function of the pressure. This is followed by a two-phase region characterized by invariant pressure and consisting of the solid solution phase and the hydride phase $Be_2ZrH_{1.4}$. When the solid solution phase disappears, the pressure increases rapidly as a function of composition; at $Be_2ZrH_{2.3}$ the indicated pressure was $1.3 \times 10^4$ kPa. The X-ray diffraction studies showed that the hydride phase had the same hexagonal structure as the intermetallic, but that the c-axis has expanded and the a-axis had contracted (a=0.372 nm, c=0.347 nm for $Be_2ZrH_{1.5}$ and a=0.382 nm, c=0.324 nm for $Be_2Zr$). The dissociation pressure of the hydride at room temperature was not determined accurately, but was less than 100 Pa. Another isotherm at 315° C. showed continuous solid solution behavior with a limiting composition corresponding to $Be_2ZrH$ under atmospheric hydrogen pressure.

Limited data on $Be_2Hf$ showed similar behavior at room temperature and atmospheric pressure, but the hydride composition appeared to be somewhat less: $Be_2HfH$ vs. $Be_2ZrH_{1.5}$.

$Be_2Ti$ did not form a hydride phase when exposed to hydrogen at atmospheric pressure and room temperature. When heated to 375° C. and cooled slowly to room temperature, $Be_2TiH_{0.05}$ appeared to be the limiting composition and X-ray diffraction of this sample showed a small expansion of the cubic $Be_2Ti$ lattice. However, when $Be_2Ti$ was cooled to room temperature from 200° C. under hydrogen pressures in excess of $10^4$ kPa, a composition near $Be_2TiH_3$ was indicated. Essentially all the hydrogen was released when the pressure was reduced to atmospheric and this hydride is therefore quite unstable when compared to the beryllium zirconium hydride.

$Be_2V$ showed behavior similar to that of $Be_2Ti$ in that no hydride phase was observed when the intermetallic was exposed to hydrogen at atmospheric pressure. The limiting composition was $Be_2VH_{0.08}$ at room temperature and 101 kPa.

EXAMPLE 2

According to the Rule of Reversed Stability which follows from the work of Miedema and coworkers reported in the *J. Less Common Metals*, vol. 35, p. 65 (1974) and vol. 42, p. 163 (1975) it should be possible to increase the dissociation pressure of the zirconium-based alloy hydride ($Be_2ZrH_2$) by substituting Ti for Zr. Conversely, the dissociation pressure of the titanium based alloy hydride ($Be_2TiH_2$) should decrease by substitution of Zr for Ti. Such substitution was attempted, but the changes in dissociation pressure were not sufficiently large due to the very limited range of solid solubility. At atmospheric hydrogen pressure and room temperature the reaction was $$Be_2Ti_{0.3}Zr_{0.7} + \tfrac{1}{2}H_2 \rightleftharpoons Be_2Ti_{0.3}Zr_{0.7}H.$$

EXAMPLE 3

Manipulation of the dissociation pressure may also be possible by substitution for beryllium. $Be_{1.5}Cu_{0.5}Ti$, for example, absorbed hydrogen to the composition $Be_{1.5}Cu_{0.5}TiH_{0.2}$ at room temperature and 101 kPa. No hydride phase is indicated under these conditions, but the hydrogen to metal ratio has increased by a factor of 4 compared to $Be_2TiH_{0.05}$, indicating a considerable reduction in the equilibrium pressure.

EXAMPLE 4

Further manipulation of the dissociation pressure may be accomplished by a combination of substitutions such as shown below $$Be_{2-x}Cu_xZr_{1-y}Ti_y + z/2 \, H_2 \rightleftharpoons Be_{2-x}Cu_xZr_{1-y}Ti_yH_z$$

EXAMPLE 5

The six structures $Be_2Zr$ (C22), $Be_2Hf$ (C22), $Be_2Nb$ (C15), $Be_2Ta$ (C15), $Be_2Ti$ (C15) and $Be_2V$ (C14) are modified by substitutions at levels x and y which retain the respective C22, C15 and C14 phases as illustrated in Table 1.

TABLE 1

| Formula | x | y | Phase |
|---|---|---|---|
| $Be_2Zr_{1-y}Ti_y$ | — | 0.1, 0.3 | C22 |
| $Be_2Zr_{1-y}V_y$ | — | 0.05, 0.1 | C22 |
| $Be_2Zr_{1-y}Ta_y$ | — | 0.05, 0.3 | C22 |
| $Be_2Zr_{1-y}Nb_y$ | — | 0.05, 0.5 | C22 |
| $Be_{2-x}Cu_xTi$ | 0.1, 0.5 | — | C15 |
| $Be_{2-x}Cu_xZr$ | 0.1, 0.2 | — | C15 |
| $Be_{2-x}Cu\,Hf$ | 0.1, 0.2 | — | C22 |
| $Be_{2-x}Cu_xNb$ | 0.1, 0.2 | — | C15 |
| $Be_{2-x}Cu_xTa$ | 0.1, 0.2 | — | C15 |
| $Be_{2-x}Cu_xV$ | 0.1, 0.2 | — | C14 |
| $Be_{2-x}Cu_xZr_{1-y}Ti_y$ | 0.1, 0.5 | 0.2, 0.3 | C22 |
| $Be_{2-x}Cu_xZr_{1-y}V_y$ | 0.1, 0.2 | 0.05, 0.1 | C22 |
| $Be_{2-x}Cu_xZr_{1-y}Ta_y$ | 0.1, 0.5 | 0.2, 0.3 | C22 |
| $Be_{2-x}Cu_xZr_{1-y}Nb_y$ | 0.1, 0.2 | 0.2, 0.3 | C22 |
| $Be_{2-x}Cu_xZr_{1-y}Al_y$ | 0.1, 0.2 | 0.2, 0.3 | C22 |
| $Be_2Zr_{0.8}Hf_{0.1}Al_{0.1}$ | | | C22 |
| $Be_{2-x}Cr_xTi$ | 0.1, 0.2 | | C15 |
| $Be_{2-x}Ni_xTi$ | 0.1, 0.2 | | C15 |
| $Be_{2-x}Cr_xV$ | 0.1, 0.2 | | C14 |
| $Be_{2-x}Ni_xTa$ | 0.1, 0.2 | | C15 |

TABLE 1-continued

| Formula | x | y | Phase |
|---|---|---|---|
| $Be_{2-x}Cr_xNb$ | 0.1, 0.2 | | C15 |
| $Be_{2-x}Mn_xZr$ | 0.1, 0.2 | | C22 |
| $Be_{2-x}Fe_xZr$ | 0.1, 0.2 | | C22 |
| $Be_{2-x}Co_xZr$ | 0.1, 0.2 | | C22 |
| $Be_{2-x}Fe_xHf$ | 0.1, 0.2 | | C22 |
| $Be_2Zr_{1-y}Al_y$ | | 0.1, 0.2 | C22 |
| $Be_2Zr_{1-y}Ag_y$ | | 0.1, 0.2 | C22 |
| $Be_2Hf_{1-y}Al_y$ | | 0.1, 0.2 | C22 |

Each of the alloys reversibly absorbs hydrogen at appropriate temperatures and pressure.

What is claimed is:

1. A hydride composition of the formula $$Be_{2-x}A_xT_{1-y}M_yH_z$$

wherein the alloy $Be_{2-x}A_xT_{1-y}M_y$ is of an Aluminum Boride Phase Structure, Cubic C15 Laves Phase Structure or Hexagonal C14 Laves Phase Structure,
   wherein A is at least one transition metal selected from the group consisting of Cr, Mn, Fe, Co, Nu and Cu,
   wherein T is at least one Group IV or V metal selected from the group consisting of Ti, Zr, Hf, V, Nb and Ta,
   wherein M is at least one metal selected from the group consisting of W, Mo, Ag, Pd, Re and Al, and
   wherein x is between 0 and 0.5, y is between 0 and 0.5 and z is at least 0.1.

2. The hydride composition of claim 1 wherein T is Zr.

3. The hydride composition of claim 1 wherein T is a mixture of 70–95% Zr with 5–30% of at least one of Ti, V, Nb or Ta, by atom percent.

4. The hydride composition of claim 3 wherein y is 0 and A is Mn, Fe or Co.

5. The hydride of claim 1 wherein T is Zr, x is 0 and M is Al, Ag or Mo.

6. The hydride of claim 1 wherein T is Ti, y is 0 and A is Cr, Ni or Cu.

7. The hydride of claim 1 wherein T is V, Nb or Ta, y is 0 and A is Cr, Ni or Cu.

8. The hydride of claim 1 wherein T is Zr, y is 0 and A is Mn, Fe or Co.

9. The hydride of claim 1 where T is Hf, y is 0 and A is Mn, Fe or Co.

10. A method of forming a hydride composition which comprises reacting gaseous hydrogen with an alloy of the formula $Be_{2-x}A_xT_{1-y}M_y$, said alloy being of an Aluminum Boride Phase Structure, Cubic C15 Laves Phase Structure or Hexagonal C14 Laves Phase Structure,
   wherein A is at least one transition metal selected from the group consisting of Cr, Mn, Fe, Co, Ni and Cu,
   wherein T is at least one Group IV or V metal selected from the group consisting of Ti, Zr, Hf, V, Nb and Ta,
   wherein M is at least one metal selected from the group consisting of W, Mo, Ag, Pd, Re and Al, and
   wherein x is between 0 and 0.5 and y is between 0 and 0.5.

* * * * *